United States Patent
Lee et al.

(10) Patent No.: US 12,409,548 B2
(45) Date of Patent: Sep. 9, 2025

(54) GRIPPER FOR A DOOR AND A CONTROL METHOD THEREOF

(71) Applicants: HYUNDAI MOTOR COMPANY, Seoul (KR); KIA CORPORATION, Seoul (KR)

(72) Inventors: Seung Ho Lee, Incheon (KR); Beomjun Kim, Anyang-si (KR); Seongsul Lee, Gunpo-si (KR); Moonhee Lee, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 125 days.

(21) Appl. No.: 18/511,310

(22) Filed: Nov. 16, 2023

(65) Prior Publication Data
US 2024/0416511 A1  Dec. 19, 2024

(30) Foreign Application Priority Data

Jun. 15, 2023 (KR) .................. 10-2023-0076734

(51) Int. Cl.
*B25J 9/16* (2006.01)
*B25J 11/00* (2006.01)
*B25J 13/08* (2006.01)
*B25J 15/00* (2006.01)
*B25J 19/02* (2006.01)

(52) U.S. Cl.
CPC ........... *B25J 9/1612* (2013.01); *B25J 9/1633* (2013.01); *B25J 9/1664* (2013.01); *B25J 13/088* (2013.01); *B25J 15/0061* (2013.01); *B25J 19/022* (2013.01)

(58) Field of Classification Search
CPC ...... B25J 9/1612; B25J 9/1633; B25J 9/1664; B25J 13/088; B25J 15/0061; B25J 19/022; B25J 15/0014; B25J 9/161; B25J 9/1679
See application file for complete search history.

(56) References Cited

U.S. PATENT DOCUMENTS 4,627,158 A * 12/1986 Mitoh ................... B23P 19/047
29/771
4,654,949 A *  4/1987 Pryor .................... B25J 9/1697
29/709

(Continued)

FOREIGN PATENT DOCUMENTS

| KR | 20110063144 A | 6/2011 |
| KR | 20110124921 A | 11/2011 |
| KR | 102097948 B1 | 4/2020 |

*Primary Examiner* — Jaime Figueroa
(74) *Attorney, Agent, or Firm* — Lempia Summerfield Katz LLC

(57) ABSTRACT

A gripper mounted on a robot is used in a smart factory to pick a door loaded on a pallet. The gripper includes: a frame mounted on a tool changer of the robot; a picking unit mounted on a front of the frame and applying pressure to and regulating each of upper and lower points of an opening formed in an inner panel of the door through a bundle pin locator; and a pressure control valve adjusting the pressure of guide air cylinders. The gripper further includes: a side clamping unit mounted on the frame and holding a side point of the opening by a fixing locator and a clamper operating with a driving force of a clamping cylinder; and a control unit adjusting a moving distance of the robot based on a distance difference between the side clamping unit and the inner panel.

17 Claims, 11 Drawing Sheets

(56) References Cited

U.S. PATENT DOCUMENTS

| | | | | |
|---|---|---|---|---|
| 4,757,608 A * | 7/1988 | Ochi | B62D 65/06 | 29/430 |
| 4,961,257 A * | 10/1990 | Sakamoto | B62D 65/06 | 29/823 |
| 5,602,967 A * | 2/1997 | Pryor | G01B 11/00 | 700/254 |
| 5,608,847 A * | 3/1997 | Pryor | A01B 69/008 | 901/31 |
| 6,112,470 A * | 9/2000 | Hashimoto | B60J 5/0405 | 49/502 |
| 6,167,607 B1 * | 1/2001 | Pryor | B25J 19/021 | 29/702 |
| 6,301,763 B1 * | 10/2001 | Pryor | B23P 19/10 | 29/702 |
| 6,314,631 B1 * | 11/2001 | Pryor | B62D 1/28 | 29/407.04 |
| 6,317,953 B1 * | 11/2001 | Pryor | B23P 19/10 | 29/721 |
| 6,421,893 B1 * | 7/2002 | Katayama | B62D 65/06 | 29/796 |
| 6,711,800 B2 * | 3/2004 | Savoy | B62D 65/06 | 29/434 |
| 7,008,166 B1 * | 3/2006 | Grimes | B66C 23/48 | 254/114 |
| 8,256,811 B2 * | 9/2012 | Yeum | B25J 15/0052 | 269/905 |
| 8,534,983 B2 * | 9/2013 | Schoenfeld | B25J 15/0206 | 414/739 |
| 10,099,737 B2 * | 10/2018 | Macri | B25J 11/005 | |
| 10,155,555 B2 * | 12/2018 | Lee | B62D 65/06 | |
| 10,486,759 B2 * | 11/2019 | Hahn | B25J 9/0084 | |
| 10,526,032 B2 * | 1/2020 | Macri | B62D 65/06 | |
| 10,766,551 B2 * | 9/2020 | Lee | B62D 65/06 | |
| 2009/0001763 A1 * | 1/2009 | Emerich | B62D 65/06 | 296/202 |
| 2009/0317223 A1 * | 12/2009 | Schoenfeld | E02F 3/4135 | 414/800 |
| 2011/0022228 A1 * | 1/2011 | Mikurube | B62D 65/06 | 700/248 |
| 2011/0133501 A1 * | 6/2011 | Yeum | B25J 15/0061 | 294/81.2 |
| 2012/0056440 A1 * | 3/2012 | Yeum | B25J 15/0061 | 294/81.2 |
| 2014/0165360 A1 * | 6/2014 | Mangiarino | B62D 65/06 | 29/407.1 |
| 2015/0082608 A1 * | 3/2015 | Lee | B62D 65/06 | 29/700 |
| 2017/0349228 A1 * | 12/2017 | Hahn | B25J 9/0084 | |
| 2019/0071142 A1 * | 3/2019 | Lee | B62D 65/06 | |

* cited by examiner

FIG. 7
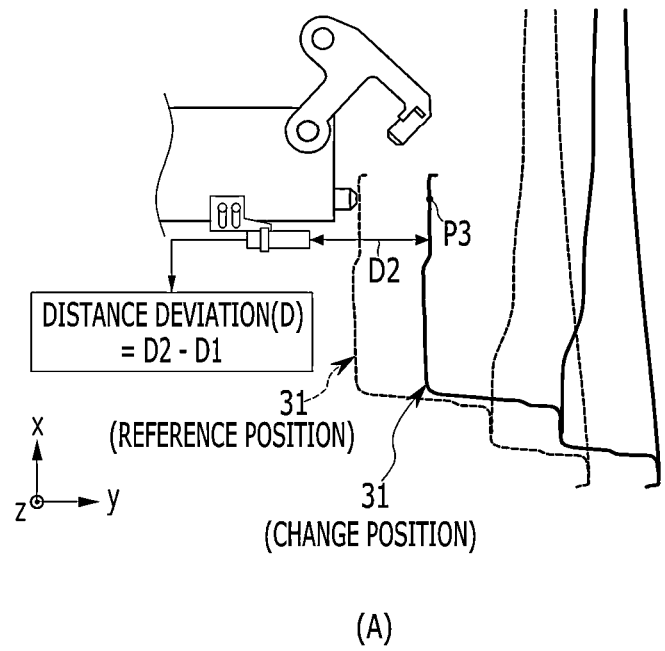
(A)
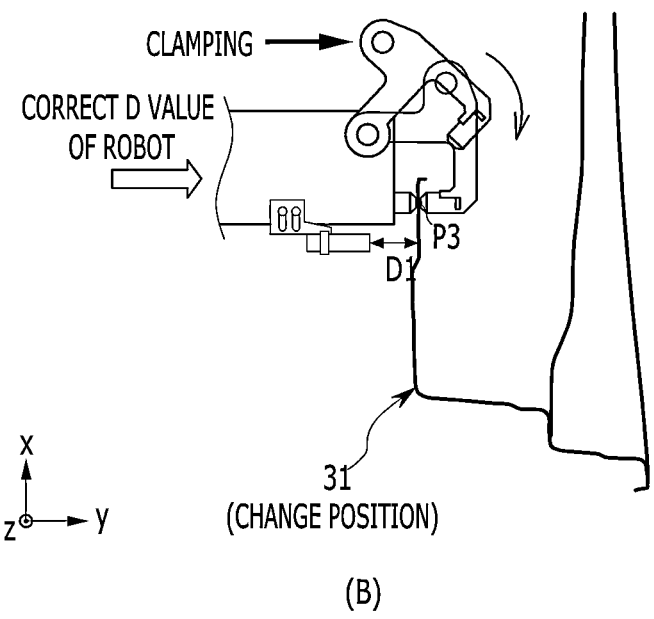
(B)

GRIPPER FOR A DOOR AND A CONTROL METHOD THEREOF

CROSS-REFERENCE TO RELATED APPLICATION

This application claims priority to and the benefit of Korean Patent Application No. 10-2023-0076734, filed on Jun. 15, 2023, the entire contents of which are incorporated herein by reference.

BACKGROUND

(a) Field

The present disclosure relates to a gripper for a door and a control method thereof, and more specifically, to a gripper for a door mounted on a robot and extracting a door panel loaded on a pallet, and its control method.

(b) Description of the Related Art

Generally, in order to automate a door mounting process in a smart factory, a pallet supplying a door panel must be placed in a designated rack and a robot must automatically pick and extract the door panel. In order to prevent a line interruption (stop) in such an automation process, a logistics rotation between real pallets on which a certain amount of door panels are loaded and empty pallets on which no door panel is loaded must be performed smoothly. Therefore, it is desired to manufacture and operate a large number of pallets for a smooth logistics rotation.

A divider is installed on the pallet to fix loaded door panels in a vertical direction. The divider plays an important role in determining a picking position within the pallet so that the robot may extract the door panels through a gripper. However, the divider may be twisted or deformed during use, which causes a position error in the divider for each pallet. Therefore, when the position error in the divider for each pallet occurs while operating a large number of pallets, an event situation occurs in which the door panels may not be extracted due to a change in the picking position of the robot, which is a problem that causes a line interruption and a decrease in an operation rate in the smart factory.

In order to prevent such a problem of the line interruption, when manufacturing a new pallet, a pallet teaching management work may be performed to select a reference pallet for teaching the door panel picking position of the robot and to customize and confirm that the remaining pallets have the same picking positions as the reference pallet. However, the pallet teaching management work of the related art has a problem of requiring periodic checking and incurring high cost to maintain and manage a pallet precision even during mass production, and has the disadvantage that the problem continuously occurs.

In the related art, a gripper for a door utilizes upper and lower clamps movably installed through an electric cylinder and a guide rail in correspondence to differences in inner panel shapes and heights of multi-vehicle doors. However, the gripper for the door of the related art clamps the door panel in point contact and has a problem of hindering an operation rate by not picking the door panel when a loading position of the door panel within a pallet changes. In addition, when using the electric cylinder and the guide rail, the gripper for the door of the related art has a disadvantage in that the weight of the gripper increases, which affects an operating load of the robot, and has a problem that it takes a lot of time to fix a failure when the electric cylinder fails.

The matters described in the Background section are provided to enhance the understanding of the background of the present disclosure, and may include matters that are not already known to those of ordinary skill in the art to which this technology pertains.

SUMMARY

The present disclosure provides a gripper for a door that is capable of absorbing a position error of a door panel for each pallet so that a robot is capable of picking the door panel, and adapting to an inner shape of a multi-vehicle door panel so that the gripper is commonly usable in one line, and its control method.

According to one aspect of the present disclosure, a gripper mounted on a robot used in a smart factory to pick a door loaded on a pallet may include: a frame mounted on a tool changer of the robot; and a picking unit mounted on a front of the frame and applying pressure to and regulating each of an upper point and a lower point of an opening formed in an inner panel of the door through a bundle type pin locator (namely, a bundle pin locator). The gripper further includes: a pressure control valve adjusting the pressure of guide air cylinders each applied to the picking unit; a side clamping unit mounted on the front of the frame and holding (e.g., clamping) a side point of the opening by using a fixing locator and a clamper operated with a driving force of a clamping cylinder; and a control unit adjusting a moving distance of the robot by measuring a distance difference between the side clamping unit and the inner panel by using a laser sensor.

In addition, the frame may include a first vertical frame installed on the front and mounting the picking unit thereon; and a second vertical frame disposed at a position parallel to the first vertical frame and mounting the side clamping unit thereon.

In addition, the picking unit may include an upper picking unit regulating the upper point of the inner panel through the bundle type pin locator transferring a force in an upward direction by using the pressure of the guide air cylinder; and a lower picking unit regulating the lower point of the inner panel through the bundle type pin locator transferring the force in a falling direction by using the pressure of the guide air cylinder.

In addition, the bundle type pin locator may include a plurality of hexagon pin locators arranged in a bundle type structure at a part in contact with the inner panel; a support rod extending in a longitudinal direction from lower portions of the plurality of hexagon pin locators and penetrating a horizontal plate configured inside a housing; a spring installed around the support rod and supporting the lower portions of the plurality of hexagon pin locators; a locking plate installed at the lowest end of the support rod and locked on a lower surface of the horizontal plate; and a laser beam sensor installed in a horizontal direction in a lower portion of the housing and sensing falling positions of the plurality of hexagon pin locators in contact with the inner panel.

In addition, the plurality of hexagon pin locators are each a pin having a regular hexagonal cross-sectional shape and may form an anti-slip pattern in a comb pattern shape on an upper surface thereof in contact with the inner panel.

In addition, the plurality of hexagon pin locators may be densely arranged, with adjacent regular hexagonal cross-sections facing each other, and the plurality of hexagon pin locators may each move up and down by the weight of the inner panel in contact with the upper surface thereof and an elastic force of the spring supporting a lower portion of the inner panel.

In addition, the laser beam sensor may include a light emitting unit and a light receiving unit, and sense that a falling position of the locking plate reaches a reference position by using a laser beam transmitted from the light emitting unit and received horizontally by the light receiving unit. Then, the laser beam sensor may transmit a falling sensing signal to the pressure control valve.

In addition, the pressure control valve may include an upper pressure control valve and a lower pressure control valve respectively configured to correspond to the upper picking unit and the lower picking unit, and the upper pressure control valve and the lower pressure control valve may set the pressure of the guide air cylinder to a low pressure lower than a critical pressure during initial operations of the upper picking unit and the lower picking unit to prevent damage to the inner panel.

In addition, the upper pressure control valve and the lower pressure control valve may maintain a low pressure lower than the critical pressure until receiving the falling sensing signal from the laser beam sensor in a bundle type pin locator inner panel contact step. When receiving the falling sensing signal, the upper pressure control valve and the lower pressure control valve may increase the pressure of the guide air cylinder by a certain amount to strengthen a regulatory force of the inner panel.

In addition, the side clamping unit may clamp or hold an inner surface of the side point with a clamper rotating around a hinge axis by a forward operation of the clamping cylinder while the fixing locator is placed on an outer surface of the side point.

In addition, the control unit may control the upper point and the lower point to be regulated by using the picking unit after completing clamping of the side point by using the side clamping unit.

In addition, the control unit may include a robot controller that measures an actual measurement distance from the inner panel through the laser sensor and derives a distance difference between the actual measurement distance and a reference distance set based on robot teaching. The control unit may include a gripper controller interoperating with the robot controller and controlling operations of the picking unit and the side clamping unit.

In addition, the gripper controller may control the pressing force of the bundle type pin locator formed at the tip of the picking unit in stages through the pressure control valve.

According to one aspect of the present disclosure, a control method of a gripper mounted on a robot used in a smart factory to pick a door loaded on a pallet includes: moving the gripper to a set picking position of the door through motion control of the robot; and adjusting a moving distance of the robot by measuring a distance difference between a side clamping unit and an inner panel by using a laser sensor mounted on the side clamping unit of the gripper. The control method further includes: holding a side point of the inner panel by using the side clamping unit; and applying pressure to and regulating the upper point and the lower point of the inner panel through a bundle type pin locator configured in a picking unit of the gripper.

In addition, the adjusting of the moving distance of the robot includes measuring an actual measurement distance from the inner panel by using the laser sensor; and deriving the distance difference by subtracting a reference distance set based on robot teaching from the actual measurement distance.

In addition, the adjusting of the moving distance of the robot includes: comparing the distance difference with an allowable value for a clamping operation of the side clamping unit; and adjusting a position of the gripper in a forward/backward direction by the distance difference when the distance difference exceeds the allowable value.

In addition, the regulating of the upper point and the lower point may include: controlling each guide air cylinder to a low pressure by setting the pressure control valve to a low pressure in an initial operation step of the picking unit; and maintaining a low pressure while the bundle type pin locator is in contact with the inner panel and monitoring whether some of hexagon pin locators in contact with the inner panel fall to a reference position through a laser beam sensor. The control method further includes: when falling sensing signals of some of hexagon pin locators are received from the laser beam sensor, strengthening a regulatory force of the inner panel with an increased force by increasing the pressure of the guide air cylinder by a certain amount.

According to an embodiment of the present disclosure, by providing the gripper capable of adjusting or correcting the position of the robot with respect to a change in the position of the door loaded on each pallet, there is an effect of preventing a line interruption in a smart factory and improving an operation rate.

In addition, by providing the gripper capable of responding to the position error of the inner panel and the change in the shape height through the picking unit to which the bundle type pin locator is applied, there is an effect of reducing pallet teaching management costs and enabling a multi-vehicle flexible production.

In addition, by eliminating a heavy gripper to which the electric cylinder and guide rail of the related art are applied and using the lightweight gripper of the present disclosure, there is an effect of reducing a robot load and reducing an energy usage.

BRIEF DESCRIPTION OF THE DRAWINGS

FIG. 7 illustrates countermeasures according to a change in a loading position of a door panel within a pallet according to an embodiment of the present disclosure.

DETAILED DESCRIPTION

Figure 1:
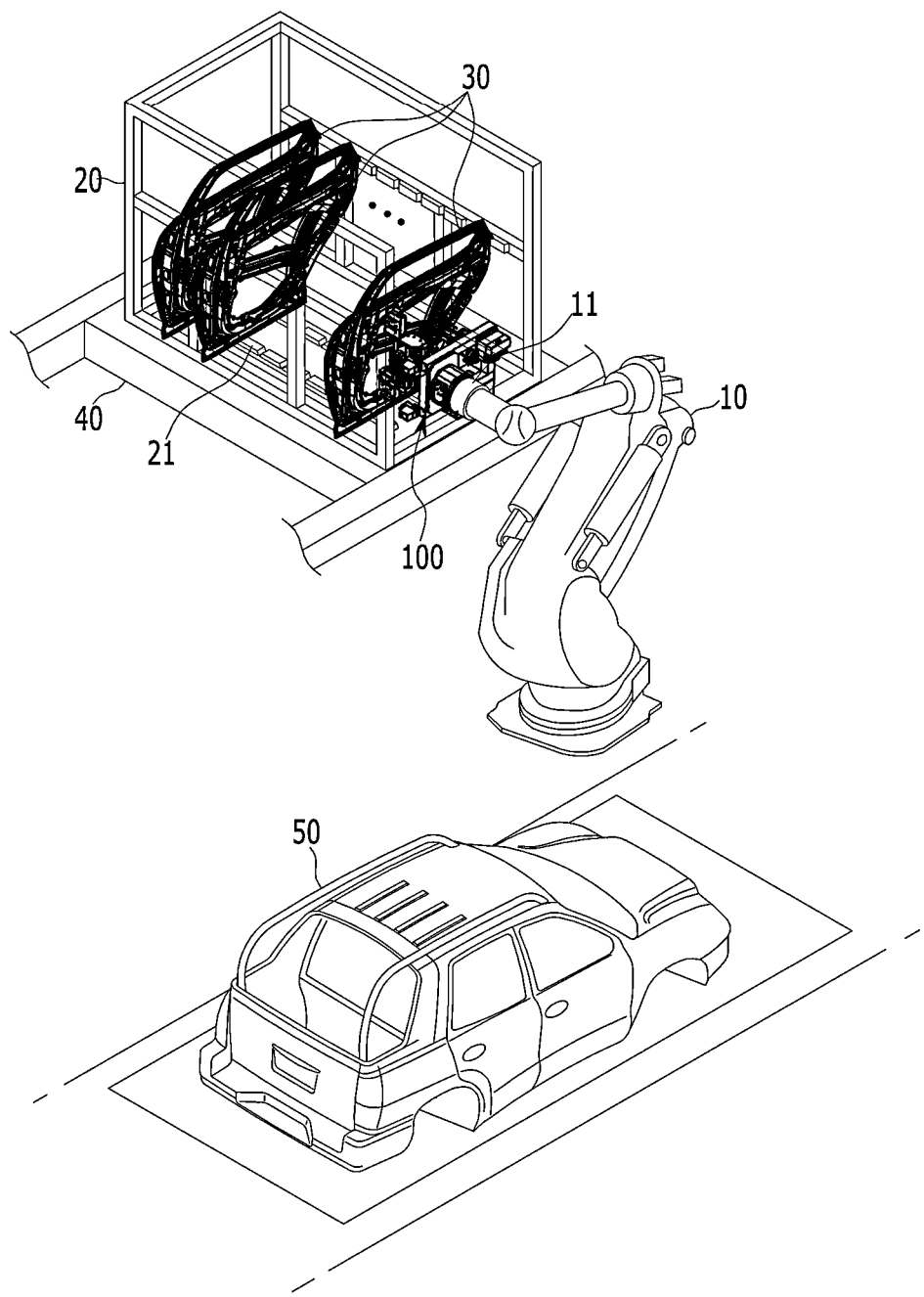
FIG. 1 schematically illustrates a door mounting process to which a gripper for a door is applied according to an embodiment of the present disclosure.

The present disclosure is described more fully hereinafter with reference to the accompanying drawings, so that those having ordinary skill in the art to which the present disclosure pertains may easily implement the embodiments of the present disclosure.

The terms used herein are for the purpose of describing specific embodiments only, and are not intended to limit the present disclosure. As used herein, singular forms are intended to also include plural forms unless the context clearly indicates otherwise. It should also be understood that the terms "comprises" and/or "comprising," when used herein, specify the presence of mentioned features, integers, steps, actions, elements and/or components, but do not exclude the presence or addition of one or more of other features, integers, steps, actions, elements, components, and/or groups thereof. As used herein, the term "and/or" includes any one or all combinations of the associated listed items.

Throughout the specification, the terms first, second, A, B, (a), (b), etc. may be used to describe various components, but the components should not be limited by the terms. These terms are only used to distinguish the component from other components, and the nature, sequence, or order of the component is not limited by the terms.

Throughout the specification, when a component is referred to as being "connected to" or "coupled to" another component, the component may be connected or coupled to the other component or intervening components may be present. In contrast, when a component is referred to as being "directly connected to" or "directly coupled to" another component, there are no intervening components present. When a component, device, element, or the like of the present disclosure is described as having a purpose or performing an operation, function, or the like, the component, device, or element should be considered herein as being "configured to" meet that purpose or to perform that operation or function.

Throughout the specification, the terms used are for the purpose of describing a specific embodiment only and is not intended to limit the present disclosure. The singular expression includes the plural expression unless the context clearly dictates otherwise.

Additionally, it is understood that one or more of the methods below or aspects thereof may be executed by at least one or more controllers. The term "controller" may refer to a hardware device including a memory and a processor. The memory is configured to store program instructions, and the processor is specifically programmed to execute the program instructions to perform one or more processes described in more detail below. A controller may control operations of units, modules, parts, devices, or similar thereto, as described herein. It is also understood that the methods below may be performed by a device including a controller along with one or more other components, as should be appreciated by those having ordinary skill in the art.

Now, a gripper for a door and its control method according to an embodiment of the present disclosure are described in detail with reference to the drawings.

FIG. 1 schematically illustrates a door mounting process to which a gripper for a door is applied according to an embodiment of the present disclosure.

Figure 2:
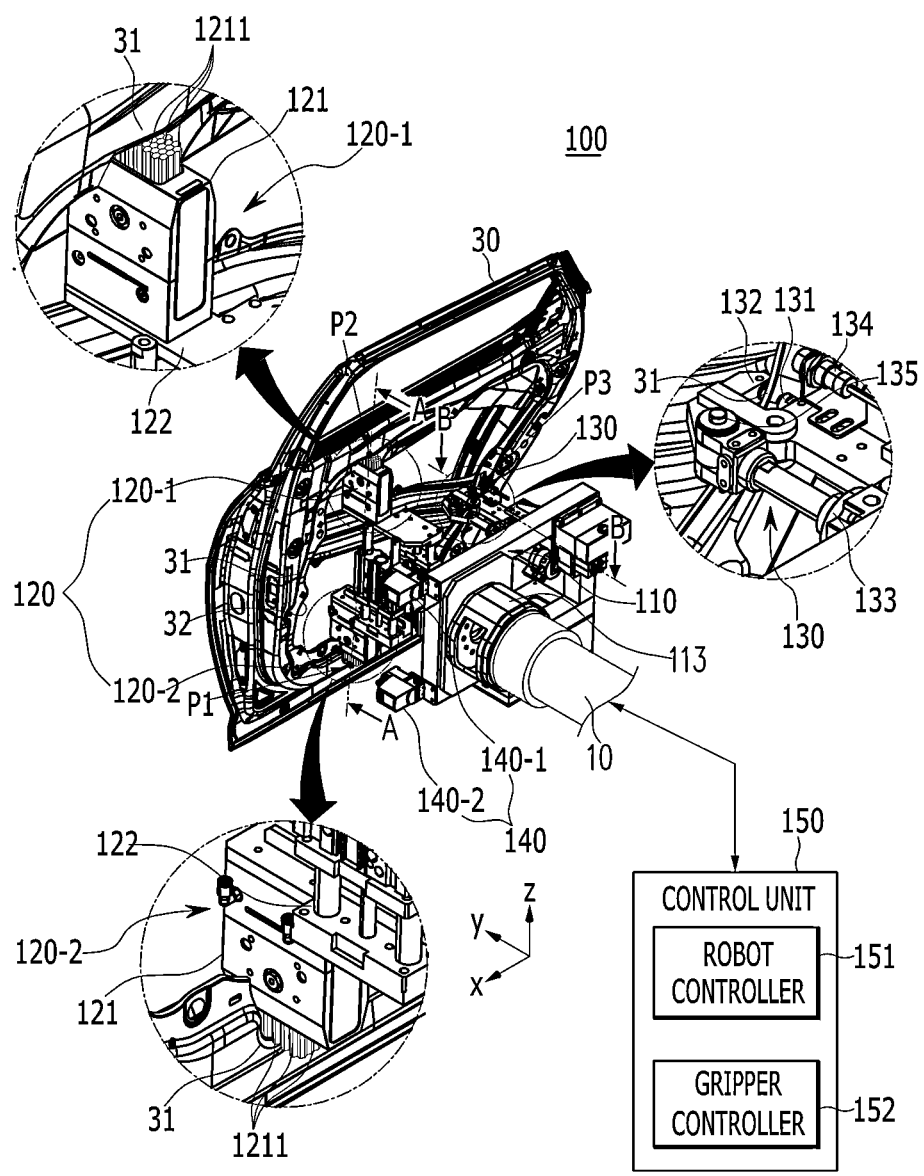
FIGS. 2 and 3 illustrate a gripper for a door and a door panel picking state using the same, according to an embodiment of the present disclosure.
Figure 3:
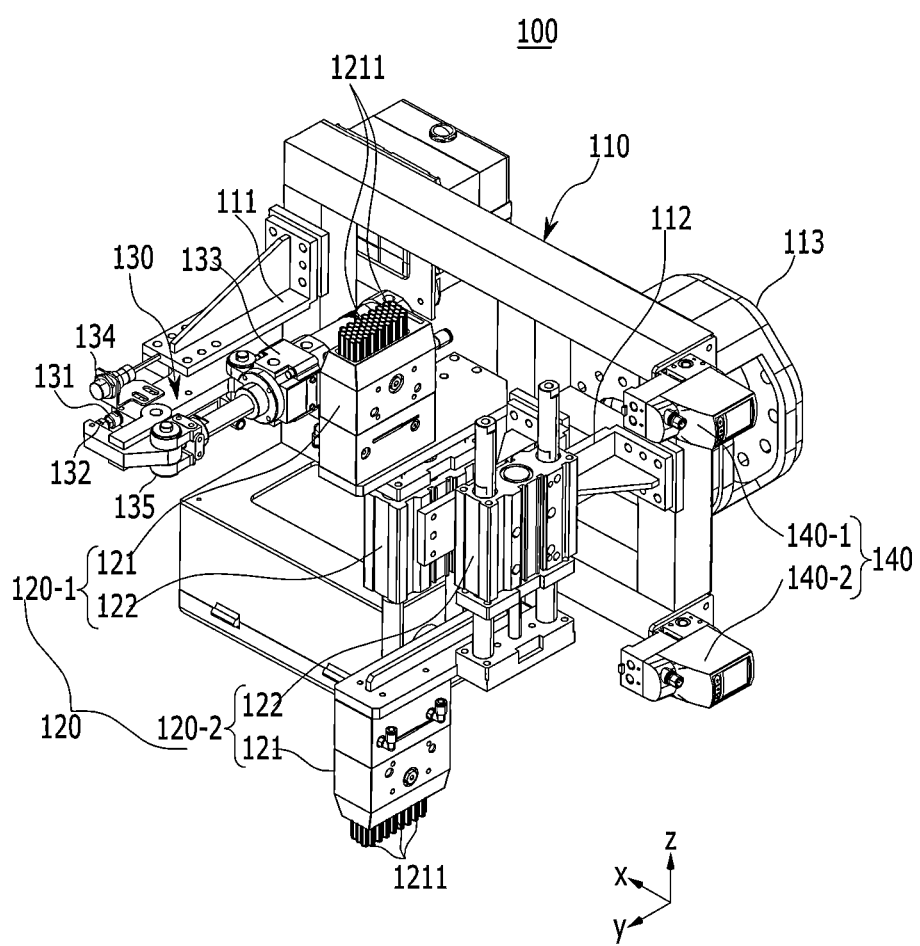

FIGS. 2 and 3 illustrate the configuration of the gripper for the door according to an embodiment of the present disclosure and a door panel picking state using the same.

Referring to FIGS. 1 to 3, a gripper 100 is mounted on a robot 10 installed in a smart factory for a door mounting process. The gripper 100 is used to pick and extract a door panel 30 loaded on a pallet 20 and assemble the door panel 30 into a car body 50.

For example, the pallet 20 is loaded with a plurality of door panels 30 (hereinafter referred to as "doors" for convenience) in an upright state by a divider 21 and moves to a pallet rack 40 set through a logistics transportation means such as an automated guided vehicle (AGV) or autonomous mobile robots (AMR) and then stands by.

The gripper 100 moves to a picking position of the door 30 set through motion control of the robot 10 having six-axis or more degrees of freedom. In addition, the gripper 100 picks the door 30 through mechanical units 120-1, 120-2, and 130 respectively regulating an upper point P1, a lower point P2, and a side point P3 of an opening 32 formed in an inner panel 31 of the door 30. Here, the picking means a state in which the door 30 is capable of being extracted (transferred) by the gripper 100 through successfully regulating (fixing) the upper point P1, the lower point P2, and the side point P3 of the opening 32. Accordingly, the robot 10 may extract the door 30 that has been successfully picked by the gripper 100 from the pallet 20.

As described above, in the related art, there was a problem causing a position error when the divider 21 fixing door panels upright loaded on the pallet 20 in the vertical direction is twisted or deformed, and this position error causes a situation in which picking the door 30 from each pallet is impossible (fails).

Accordingly, the present disclosure provides the gripper 100 for a multi-vehicle common door that enables door picking by absorbing the position error for each pallet in correspondence to the problem causing the situation in which picking is impossible due to the position error in each pallet.

The gripper 100 according to an embodiment of the present disclosure includes a frame 110, a picking unit 120, a side clamping unit 130, a pressure control valve 140, and a control unit 150.

The frame 110 is mounted on a tool changer 11 of the robot 10 through a tool mounting portion 113 formed on the rear side thereof.

The frame 110 includes a first vertical frame 111 installed in the front thereof and mounting the picking unit 120, and a second vertical frame 112 disposed in parallel with the first vertical frame 111 and mounting the side clamping unit 130.

The picking unit 120 applies pressure to and regulates each of the upper point P1 and the lower point P2 of the opening 32 formed in the inner panel 31 of the door 30 through a bundle type pin locator 121 to which a spring is applied.

The pressure control valve 140 controls the pressure of a guide air cylinder applied to the picking unit 120.

The side clamping unit 130 clamps the side point P3 of the opening 32 by using a fixing locator 131 and a clamper 132 operating with a driving force of a clamping cylinder 133.

The control unit 150 corrects a moving distance of the robot 10 by measuring a distance deviation with the inner panel 31 through a laser sensor 134 before clamping.

The picking unit 120 includes the upper picking unit 120-1 and the lower picking unit 120-2 installed on the first vertical frame 111. The upper picking unit 120-1 and the lower picking unit 120-2 only have different operating directions according to installed positions but have the same configuration.

For example, the upper picking unit 120-1 may regulate the upper point P1 of the inner panel 31 through the bundle type pin locator 121 transferring force in an upward direction by using the pressure of the guide air cylinder 122.

In addition, the lower picking unit 120-2 may regulate the lower point P2 of the inner panel 31 through the bundle type pin locator 121 transferring force in a falling direction by using the pressure of the guide air cylinder 122.

Figure 4:
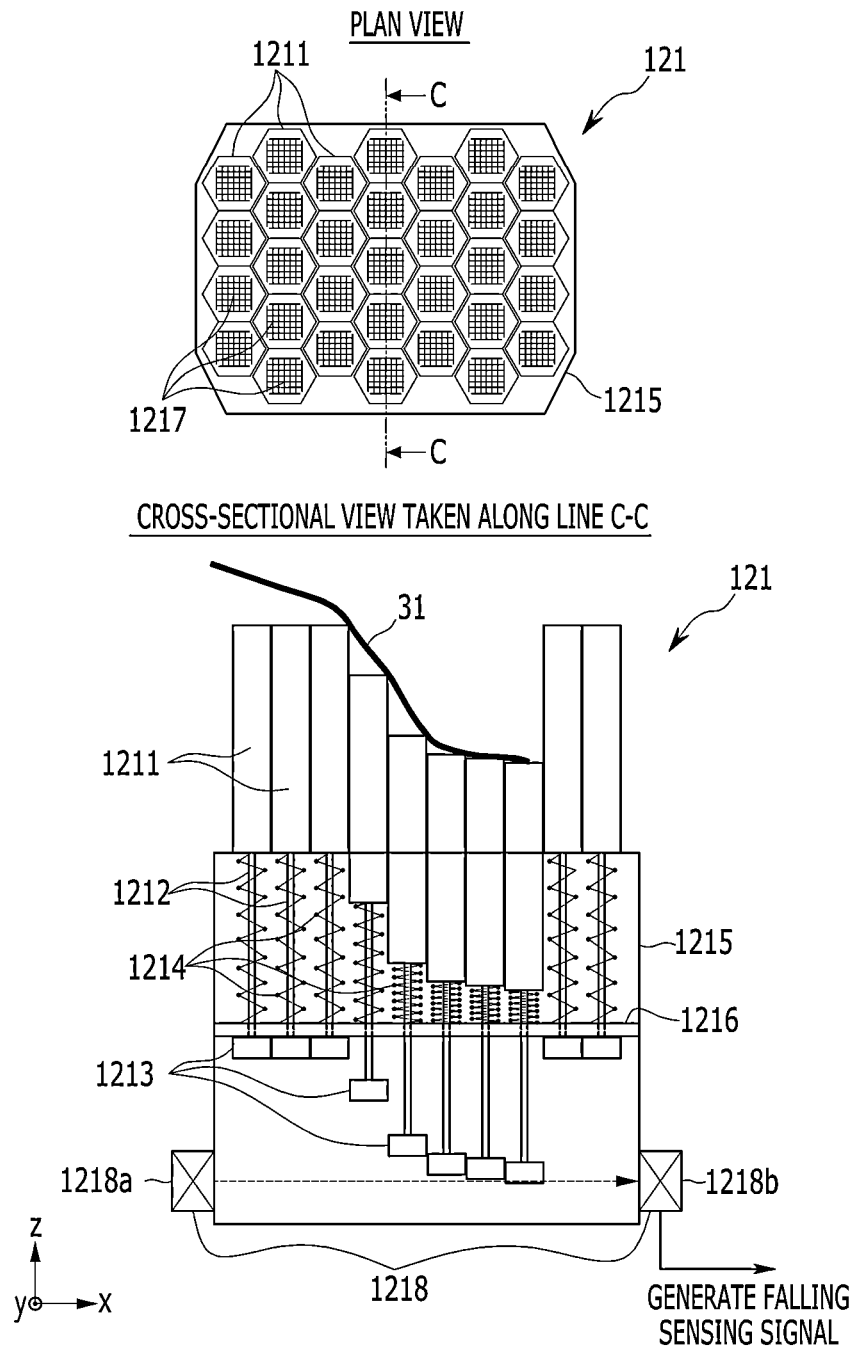
FIG. 4 illustrates the detailed configuration of a bundle type pin locator according to an embodiment of the present disclosure.

FIG. 4 illustrates the detailed configuration of the bundle type pin locator according to an embodiment of the present disclosure.

Referring to FIG. 4, in the bundle type pin locator 121 according to an embodiment of the present disclosure, a plurality of hexagon pin locators 1211 are disposed in a bundle type structure in a part in contact with the inner panel 31 so that regulation is possible even though the position and/or shape of the inner panel 31 is changed in various ways due to a position error of the pallet 20.

The bundle type pin locator 121 includes the plurality of hexagon pin locators 1211 disposed in the bundle type structure in the part in contact with the inner panel 31, a support rod 1212 extending in a longitudinal direction from a lower portion of the hexagon pin locator 1211 and penetrating a horizontal plate 1216 formed inside a housing 1215, a locking plate 1213 installed at the lowest end of the support rod 1212 and locked on a lower surface of the horizontal plate 1216, a spring 1214 installed around the support rod 1212 and supporting the lower portion of the hexagon pin locator 1211, and a laser beam sensor 1218 installed in a horizontal direction in a lower portion of the housing 1215 and sensing a falling position of the hexagon pin locator 1211 in contact with the inner panel 31.

The hexagon pin locators 1211 are each a pin having a regular hexagonal cross-section shape and may form an anti-slip pattern 1217 in a comb pattern shape on an upper surface thereof in contact with the inner panel 31 of a door.

The hexagon pin locators 1211 may be densely disposed in the longitudinal direction of the pin, with adjacent regular hexagonal cross-sections facing each other, to form the bundle type structure.

The hexagon pin locators 1211 may each move up and down by the weight of the inner panel 31 in contact with the upper surface thereof and an elastic force of the spring 1214 supporting a lower portion thereof. At this time, the hexagon pin locators 1211 may each move up and down according to the shape of the inner panel 31 in contact with the upper surface thereof.

The laser beam sensor 1218 senses the falling position of the locking plate 1213 installed at the lowest end from the hexagon pin locator 1211.

The laser beam sensor 1218 senses that the falling position of the locking plate 1213 reaches a reference position by using a laser beam transmitted and received horizontally through a light emitting unit 1218a and a light receiving unit 1218b, and transmits a falling sensing signal to the pressure control valve 140. Accordingly, the pressure control valve 140 may receive the falling sensing signal from the laser beam sensor 1218 to determine a time when the inner panel 31 is finally seated on the bundle type pin locator 121.

Figure 5:
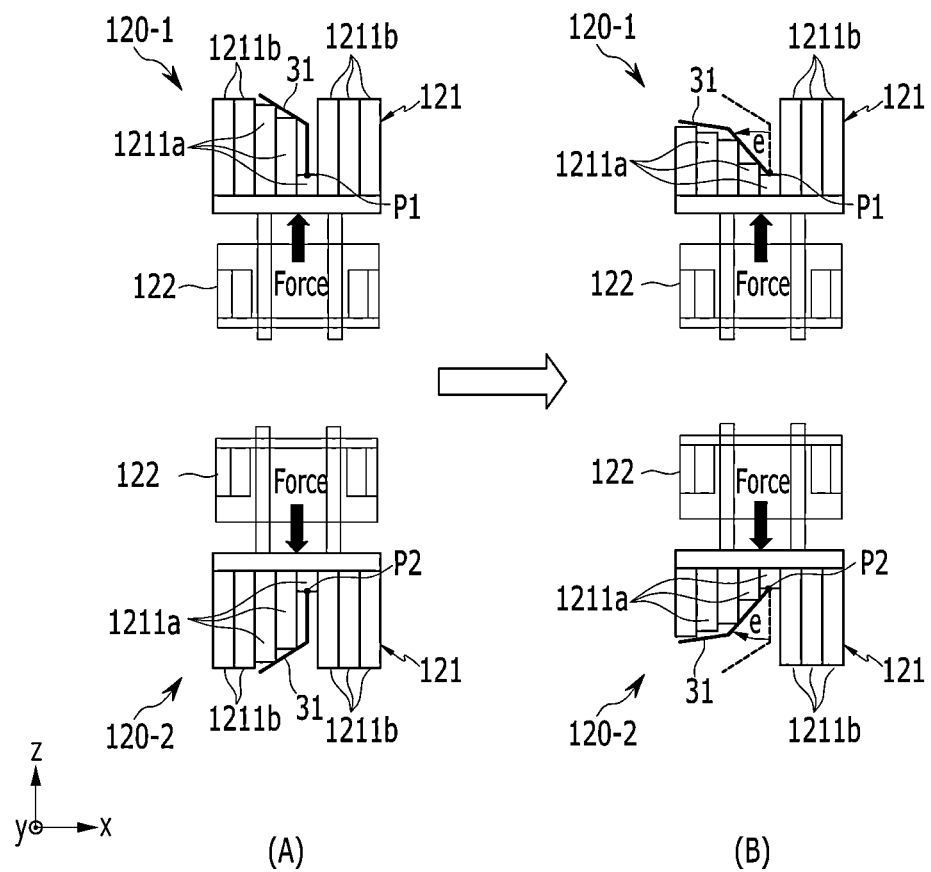
FIG. 5 is a cross-sectional view taken along line A-A of FIG. 2 and illustrates operating states of picking units with respect to a position error of a door, according to an embodiment of the present disclosure.

FIG. 5 is a cross-sectional view taken along line A-A of FIG. 2 according to an embodiment of the present disclosure, and illustrates operating states of picking units with respect to a position error of a door.

First, FIG. 5(A) illustrates states where the upper point P1 and the lower point P2 of the inner panel 31, which is normally (no position error) loaded on the pallet 20, are respectively regulated by using the upper picking unit 120-1 and the lower picking unit 120-2.

Force is applied to the bundle type pin locator 121 by the pressure of each guide air cylinder 122, so that some of hexagon pin locators 1211a in contact with the inner panel 31 move backward and the remaining hexagon pin locators 1211b remain in place. At this time, the bundle type pin locator 121 of the bundle type structure may complete picking by fixing the inner panel 31 with the pressing force of some of the hexagon pin locators 1211a, and forming a step around the inner panel 31 by the remaining hexagon pin locators 1211b to prevent the inner panel 31 from separating.

Next, FIG. 5(B) illustrates states where the upper point P1 and the lower point P2 of the inner panel 31 whose loading position has changed while a position error "e" of the pallet 20 has occurred are respectively regulated by using the upper picking unit 120-1 and the lower picking unit 120-2.

As described above, even in the state in which the position error e of the pallet 20 has occurred, the bundle type pin locator 121 of the bundle type structure may fix the inner panel 31 whose loading position has changed due to the pressing force of some of the hexagon pin locators 1211a. In addition, at the same time, the bundle type pin locator 121 of the bundle type structure may complete picking by forming a step around the inner panel 31 by the remaining hexagon pin locator 1211b to prevent the inner panel 31 from separating arbitrarily.

Therefore, the picking unit 120 according to the embodiment of the present disclosure may absorb the position error e occurred for each pallet by using the bundle type pin locator 121, thereby maintaining a state in which the robot 10 is capable of picking the door.

Referring again to FIGS. 1 to 3, the side clamping unit 130 regulates the side point P3 of the inner panel 31 by using the fixing locator 131 and the clamper 132 operating by the clamping cylinder 133.

The side clamping unit 130 clamps an inner surface of the side point P3 with the clamper 132 rotating around a hinge axis 135 by a forward operation of the clamping cylinder 133 while the fixing locator 131 is placed in an outer surface of the side point P3. In an operation opposite this, the side clamping unit 130 operates the clamping cylinder 133 backward to release the clamping of the side point P3.

The side clamping unit 130 according to an embodiment of the present disclosure includes a laser sensor 134 measuring a distance deviation (i.e., distance difference) "D" between a reference position of the inner panel 31 set based on robot teaching and a change position of the actually loaded inner panel 31.

Figure 6:
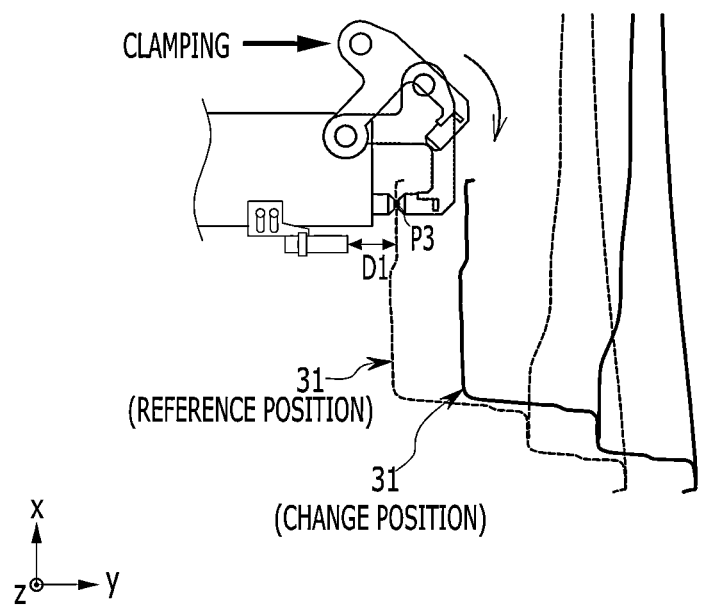
FIG. 6 is a cross-sectional view taken along line B-B of FIG. 2 and illustrates a state in which clamping is impossible due to an error in a loading position of a door panel within a pallet, according to an embodiment of the present disclosure.

Meanwhile, FIG. 6 is a cross-sectional view taken along line B-B of FIG. 2 according to an embodiment of the present disclosure, and illustrates a state in which clamping is impossible due to an error in a loading position of a door panel within a pallet.

Referring to FIG. 6, the side clamping unit 130 moves to a reference position of the inner panel 31 set based on robot teaching and operates to clamp the side point P3 of the inner panel 31 by using the fixing locator 131 and the clamper 132.

The reference position refers to a position set to have a reference distance D1 with the inner panel 31 based on robot teaching.

However, when the loading position of the door 30 changes due to a position error of a divider within the pallet 20, a deformation in a left and right direction (x-axis) is small, but a deformation in a front and back direction (y-axis) is relatively large, causing a situation in which clamping is impossible. Therefore, when picking the inner panel 31, it is necessary to compensate for a distance deviation between the side clamping unit 130 and the inner panel 31 by a change position in the front and back direction (y-axis).

Accordingly, FIG. 7 illustrates countermeasures according to a change in a loading position of a door panel within a pallet according to an embodiment of the present disclosure.

Referring to FIG. 7(A), the side clamping unit 130 according to an embodiment of the present disclosure may measure the distance deviation D between a reference position of the inner panel 31 set based on robot teaching and a change position of the actually loaded inner panel 31 by using the laser sensor 134 before clamping the inner panel 31.

For example, according to an embodiment, the laser sensor 134 may include a calculation function to calculate the distance deviation D obtained by subtracting the reference distance D1 from an actual measurement distance D2 measured before the clamping. In addition, according to an embodiment, the laser sensor 134 may transfer the actual measurement distance D2 measured before the clamping to the control unit 150 to derive the distance deviation D obtained by subtracting the reference distance D1 from the actual measurement distance D2.

Accordingly, referring to FIG. 7(B), the control unit 150 controlling the robot 10 adjusts a moving distance of the robot 10 based on the distance deviation (e.g., the distance difference) "D", thereby allowing the side clamping unit 130 to pick the inner panel 31 at the changed position.

In other words, the side clamping unit 130 is placed at the reference distance D1 from the inner panel 31 at the change position through correction of the moving distance of the robot 10, thereby clamping the side point P3 of the inner panel 31 by using the fixing locator 131 and clamper 132.

Figure 8:
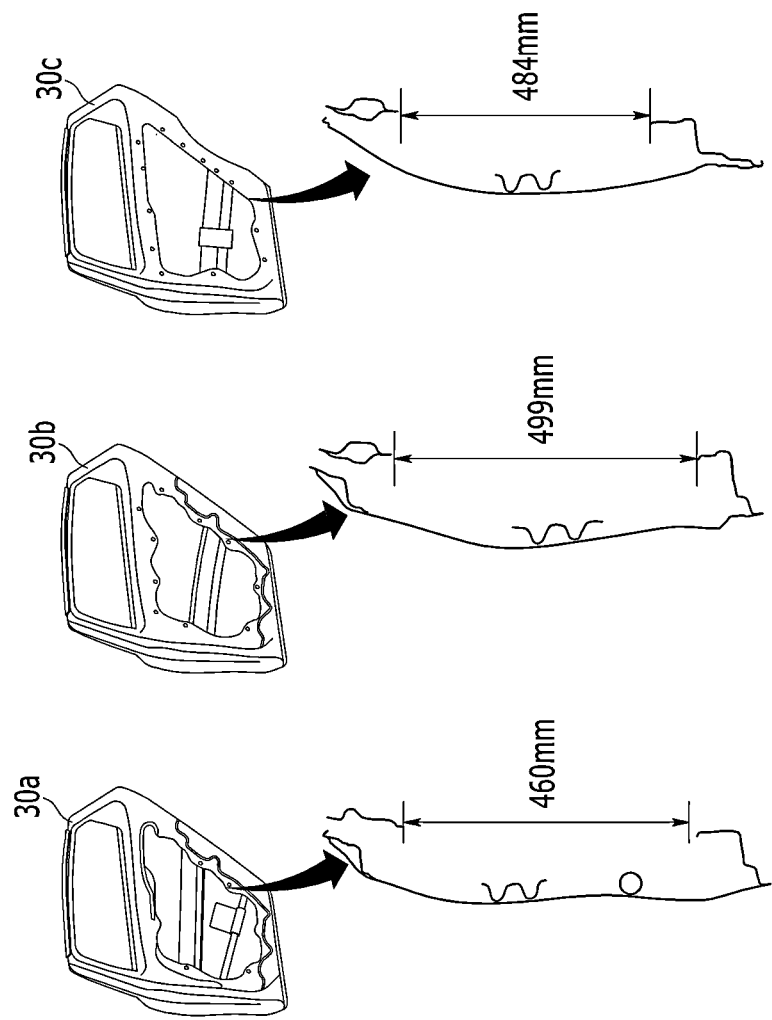
FIG. 8 illustrates height differences in inner panel shapes of multi-vehicle doors according to an embodiment of the present disclosure.

Meanwhile, FIG. 8 illustrates heights differences in inner panel shapes of multi-vehicle doors according to an embodiment of the present disclosure.

Referring to FIG. 8, heights (i.e., regulated cross-sectional heights) of inner panel shapes of multi-vehicle doors applied to a door mounting process according to an embodiment of the present disclosure may be different from each other, such as 460 mm for a door 30a of car type A, 499 mm for a door 30b of car type B, 484 mm for a door 30c of car type C, etc. Therefore, in order for the robot 10 to pick multi-vehicle doors, the picking unit 120 must move in an up/down direction (z-axis).

In this regard, the related art has proposed a gripper for a door using an upper/lower clamp movably installed through an electric cylinder and a guide rail, but has the disadvantage of increasing the weight and the problem of taking a lot of time to fix a failure.

Accordingly, the present disclosure may slowly operate the bundle type pin locator 121 up and down through force control that adjusts pressure of the guide air cylinder 122 of the picking unit 120 in stages by using the pressure control valve 140, without using an electric cylinder and a guide rail.

Here, the force control refers to a degree to which the bundle type pin locator 121 presses a regulation point of the inner panel 31.

Figure 9:
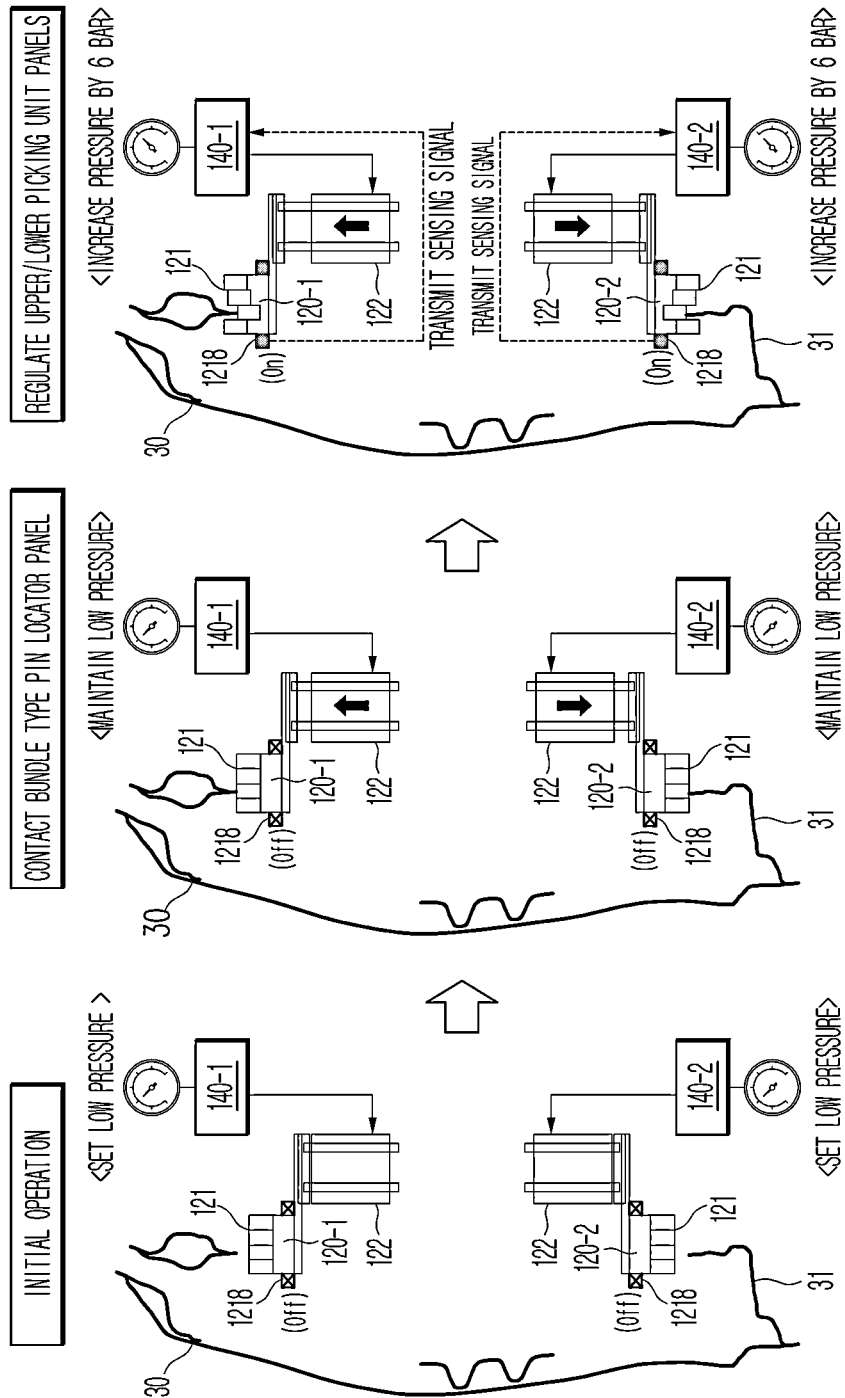
FIG. 9 illustrates a control method of a picking unit corresponding to a difference in a regulated cross-sectional height of a multi-vehicle door according to an embodiment of the present disclosure.

FIG. 9 illustrates a control method of a picking unit corresponding to a difference in a regulated cross-sectional height of a multi-vehicle door according to an embodiment of the present disclosure.

FIG. 9 illustrates a process in which the pressure control valve 140 regulates the upper point P1 and the lower point P2 of an inner panel through pressure adjustment in stages in a state in which the picking unit 120 according to an embodiment of the present disclosure is aligned at a picking position of a multi-vehicle door 30.

The pressure control valve 140 includes an upper pressure control valve 140-1 and a lower pressure control valve 140-2 configured to correspond to the upper picking unit 120-1 and the lower picking unit 120-2, respectively. The upper pressure control valve 140-1 and the lower pressure control valve 140-2 operate in the same manner. Therefore, hereinafter, an operation of the upper pressure control valve 140-1 is mainly described, but the lower pressure control valve 140-2 may also operate in the same manner.

For example, in an initial operation step, the upper pressure control valve 140-1 sets the pressure of the guide air cylinder 122 to a small force of a low pressure during the initial operation of the upper picking unit 120-1, to prevent damage to the inner panel 31. For example, the low pressure is lower than a set pressure, and the set pressure may be a critical pressure causing damage to the inner panel 31. Such a set pressure may vary depending on specifications such as a material and thickness of a door of the car body 50, and it may be understood that a person skilled in the art may apparently set the set pressure.

In a bundle type pin locator inner panel contact step, the upper pressure control valve 140-1 maintains the low pressure until receiving falling sensing signals of some of the hexagon pin locators 1211 in contact with the inner panel 31 through the laser beam sensor 1218.

In addition, in an upper/lower unit panel regulation step, the upper pressure control valve 140-1 may strengthen a regulatory force of the inner panel 31 by increasing the pressure of the guide air cylinder 122 by a certain amount (e.g. 6 bar) when receiving the falling sensing signals of the hexagon pin locators 1211 from the laser beam sensor 1218.

In other words, the upper pressure control valve 140-1 may lift the inner panel 31 with a small force to prevent damage to the inner panel 31 when the upper picking unit 120-1 rises, and, after being located in a range where the inner panel 31 is not damaged by the bundle type pin locator 121, change the pressing force with a force for handling the door 30.

In the same manner as above, the upper picking unit 120-1 and the lower picking unit 120-2 may commonly regulate the multi-vehicle door 30 regardless of the difference in the inner panel shape height within a stroke range of the guide air cylinder 122.

Meanwhile, the control unit 150 controls the overall operations of the robot 10 provided in the door mounting process and the gripper 100 mounted on the robot 10.

After completing the clamping of the side point P3 by using the side clamping unit 130, the control unit 150 may control each of the upper point P1 and the lower point P2 to be regulated by using the picking unit 120.

The control unit 150 may include a robot controller 151 and a gripper controller 152 that interoperate with each other.

The robot controller 151 moves the gripper 100 to the picking position of the door 30 loaded on the pallet 20 through motion control of the robot 10.

When moving the gripper 100 to the picking position, the robot controller 151 may measure the actual measurement distance D2 from the inner panel 31 through the laser sensor 134 and derive the distance deviation D between the reference distance D1 of the inner panel 31 set based on robot teaching and the actual measurement distance D2. In addition, the robot controller 151 may correct the position of the gripper 100 by the distance deviation D.

The gripper controller 152 may control operations of the picking unit 120 and the side clamping unit 130 of the gripper 100 that have moved to the picking position of the door 30, respectively, to regulate the upper, lower, and side points P1, P2, and P3 corresponding to the inner panel 31 of the door.

At this time, the gripper controller 152 controls the pressing force of the bundle type pin locator 121 configured at the tip of the picking unit 120 in stages through the pressure control valve 140, thereby performing adaptive regulation with respect to a change in the position and/or shape of the inner panel 31.

The control unit 150 may be implemented as one or more processors operating according to a set program, and the set program may be programmed to perform each step of a control method of a gripper for a door according to an embodiment of the present disclosure.

The control method of the gripper for the door is described in more detail with reference to the drawings below.

Figure 10:
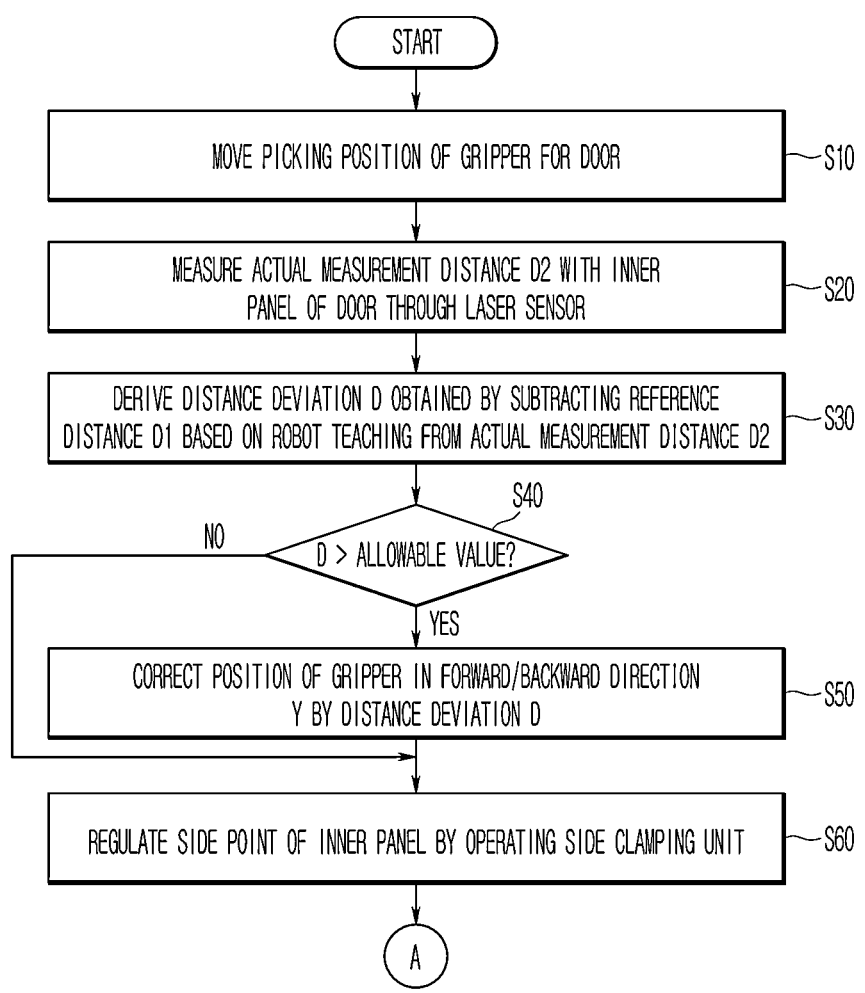
FIGS. 10 and 11 are flowcharts schematically illustrating a control method of a gripper for a door according to an embodiment of the present disclosure.
Figure 11:
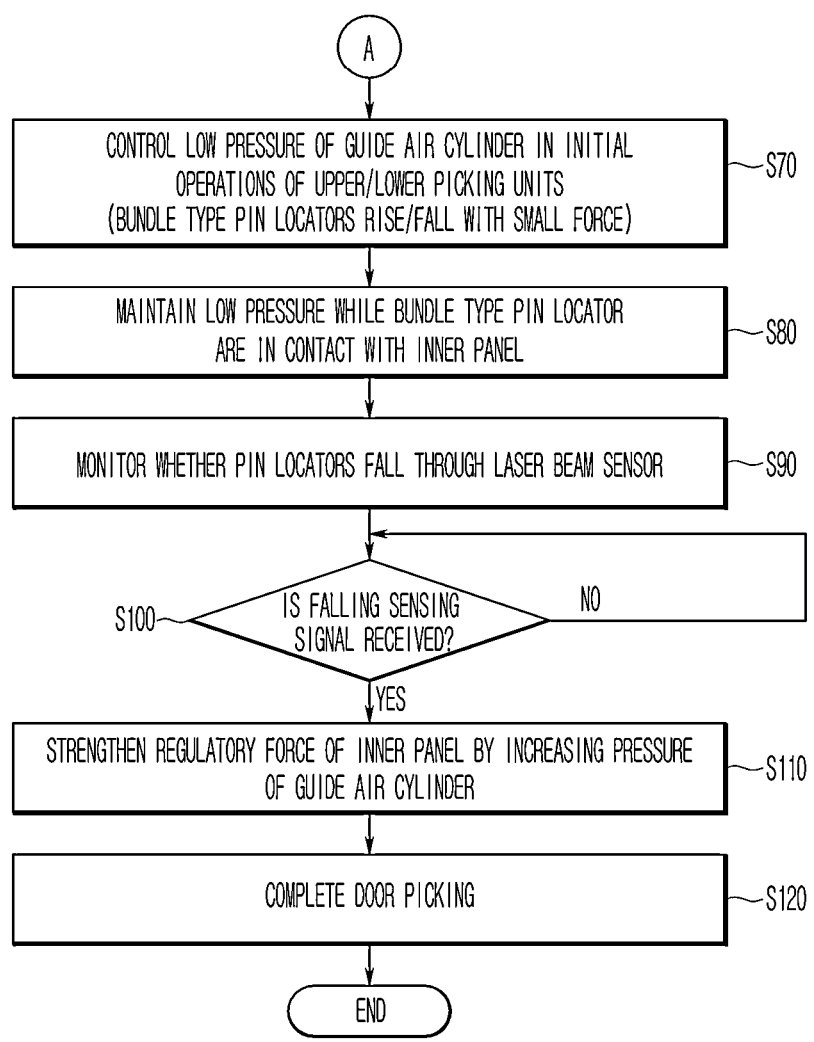

FIGS. 10 and 11 are flowcharts schematically illustrating a control method of a gripper for a door according to an embodiment of the present disclosure.

First, referring to FIG. 10, the control unit 150 of the gripper 100 for the door 30 mounted on the robot 10 according to an embodiment of the present disclosure moves the gripper 100 to a set picking position of the door 30 through motion control of the robot 10 (S10). The picking position may be a position for measuring whether a loading position of the door 30 within the pallet 20 changes before picking.

The control unit 150 measures the actual measurement distance D2 from the inner panel 31 by using the laser sensor 134 mounted on the side clamping unit 130 of the gripper 100 (S20).

The control unit 150 derives the distance deviation (i.e., distance difference) "D" obtained by subtracting the reference distance D1 set based on robot teaching from the actual measurement distance D2 (S30).

The control unit 150 compares the distance deviation D with an allowable value (e.g., ±2 mm) for a clamping operation of the side clamping unit 130 (S40).

At this time, when the distance deviation D exceeds the allowable value (S40; Yes), the control unit 150 corrects a position (that is, a position of the side clamping unit 130) of the gripper 100 in a forward/backward direction (y-axis) by the distance deviation D (S50), and operates the side clamping unit 130 to regulate (clamp) the side point P3 of the inner panel 31 (S60).

On the other hand, when the distance deviation D does not exceed the allowable value (S40; No), the control unit 150 operates the side clamping unit 130 without correcting the position of the gripper 100 to regulate the side point P3 of the inner panel 31 (S60).

According to the control method of the gripper 100 for the door 30 of the present disclosure as above, even though the loading position of the door 30 within the pallet 20 changes, the side clamping unit 130 may be clamped through distance correction. In addition, by clamping the side clamping unit 130, the picking unit 120 parallel to the front of the gripper 100 is placed at a picking possible position.

Next, FIG. 11 illustrates the flowchart in which the control unit 150 applies pressure to and regulates the upper point P1 and the lower point P2 of the inner panel 31 through the bundle type pin locator 121 configured in the picking unit 120 of the gripper 100 to rise or fall.

Specifically, the control unit 150 controls each guide air cylinder 122 to the low pressure by setting the pressure control valve 140 to a low pressure in an initial operation step of the picking unit 120. At this time, the bundle type pin locators 121 each mounted on the tip of the picking unit 120 rise/fall with a small force (S70).

The control unit 150 maintains the low pressure control while the bundle type pin locator 121 is in contact with the inner panel 31 (S80), and monitors whether some of the hexagon pin locators 1211a in contact with the inner panel 31 fall to a reference position through the laser beam sensor 1218 (S90).

At this time, when the control unit 150 does not receive falling sensing signals of some of the hexagon pin locators 1211a from the laser beam sensor 1218 (S100; No), the control unit 150 stands by while maintaining the low pressure control.

On the other hand, when the control unit 150 receives the falling sensing signals of some of the hexagon pin locators 1211a from the laser beam sensor 1218 (S100; Yes), the control unit 150 strengthens a regulatory force of the inner panel 31 with increased force by increasing the pressure of the guide air cylinder 122 by a certain amount (e.g.; 6 bar) (S110).

At this time, the control unit 150 may fix the inner panel 31 with the pressing force of some of the hexagon pin locators 1211a among the bundle type pin locators 121 of a bundle type structure, and form a step around the inner panel 31 by the remaining hexagon pin locators 1211b to complete door picking in a state where handling is possible (S120).

As described above, according to an embodiment of the present disclosure, by providing the gripper capable of correcting the position of the robot with respect to a change in the position of the door loaded on each pallet, there is an effect of preventing a line interruption in a smart factory and improving an operation rate.

In addition, by providing the gripper capable of responding to the position error of the inner panel and the change in the shape height through the picking unit to which the bundle type pin locator is applied, there is an effect of reducing pallet teaching management costs and enabling a multi-vehicle flexible production.

In addition, by eliminating a heavy gripper (e.g., 120 kg) to which the electric cylinder and guide rail of the related art are applied and using the lightweight gripper (e.g., 55 kg) of the present disclosure, there is an effect of reducing a robot load and reducing an energy usage.

The embodiment of the present disclosure is not implemented only through the device and/or method described above, and may be implemented through a program for realizing a function corresponding to the configuration of the embodiment of the present disclosure or a recording medium on which the program is recorded. Such an implementation may be easily implemented by an expert in the technical field to which the present disclosure pertains from the description of the above-described embodiments.

Although the embodiment of the present disclosure has been described in detail above, the scope of the present disclosure is not limited thereto, and various modifications and improvement forms of those skilled in the art using the basic concept of the present disclosure as defined in the following claims are also within the scope of the present disclosure.

<Description of symbols>

| | |
|---|---|
| 10: robot | 11: tool changer |
| 20: palette | 21: divider |
| 30: door | 31: inner panel |
| 32: opening | 40: rack |
| 50: vehicle body | |
| 100: gripper | 110: frame |
| 111: first vertical frame | 112: second vertical frame |
| 113: tool mounting portion | 120: picking unit |
| 120-1: upper picking unit | 120-2: lower picking unit |
| 121: bundle type pin locator | 1211: hexagon pin locator |
| 1212: support rod | 1213: locking plate |
| 1214: spring | 1215: housing |
| 1216: horizontal plate | 1217: anti-slide pattern |
| 1218: laser beam sensor | 122: guide air cylinder |
| 130: side clamping unit | 131: fixing locator |
| 132: clamper | 133: clamping cylinder |
| 134: laser sensor | 135: hinge axis |
| 140: pressure control valve | |
| 140-1: upper pressure control valve | |
| 140-2: lower pressure control valve | |
| 150: control unit | |
| 151: robot controller | 152: gripper controller |
| P1: upper point | P2: lower point |
| P3: side point | |

What is claimed is:

1. A gripper mounted on a robot to pick a door loaded on a pallet, the gripper comprising:
   a frame mounted on a tool changer of the robot;
   a picking unit mounted on a front of the frame and configured to apply pressure to and regulate each of an upper point and a lower point of an opening formed in an inner panel of the door through a bundle pin locator;
   a pressure control valve configured to adjust a pressure of guide air cylinders each applied to the picking unit;
   a side clamping unit mounted on the front of the frame and configured to hold a side point of the opening using a fixing locator and a clamper operated with a driving force of a clamping cylinder; and
   a control unit configured to adjust a moving distance of the robot by measuring a distance difference between the side clamping unit and the inner panel.

2. The gripper for the door of claim 1, wherein the frame comprises:
   a first vertical frame installed on the front and mounting the picking unit thereon; and
   a second vertical frame disposed at a position parallel to the first vertical frame and mounting the side clamping unit thereon.

3. The gripper for the door of claim 1, wherein the picking unit comprises:
   an upper picking unit configured to regulate the upper point of the inner panel through the bundle pin locator transferring a force in an upward direction using the pressure of the guide air cylinder; and
   a lower picking unit configured to regulate the lower point of the inner panel through the bundle pin locator transferring the force in a falling direction by using the pressure of the guide air cylinder.

4. The gripper for the door of claim 3, wherein the bundle pin locator comprises:
   a plurality of hexagon pin locators arranged in a bundle structure at a part in contact with the inner panel;
   a support rod configured to extend in a longitudinal direction from lower portions of the plurality of hexagon pin locators and configured to penetrate a horizontal plate configured inside a housing;
   a spring installed around the support rod and configured to support the lower portions of the plurality of hexagon pin locators;
   a locking plate installed at a lowest end of the support rod and locked on a lower surface of the horizontal plate; and
   a laser beam sensor installed in a horizontal direction in a lower portion of the housing and configured to sense falling positions of the plurality of hexagon pin locators in contact with the inner panel.

5. The gripper for the door of claim 4, wherein each hexagon pin locator of the plurality of hexagon pin locators is a pin having a regular hexagonal cross-sectional shape, and the plurality of hexagon pin locators forms an anti-slip pattern in a comb pattern shape on an upper surface thereof in contact with the inner panel.

6. The gripper for the door of claim 5, wherein:
   the plurality of hexagon pin locators are densely arranged, with adjacent regular hexagonal cross-sections facing each other, and
   each of the plurality of hexagon pin locators is configured to move up and down by a weight of the inner panel in contact with the upper surface thereof and an elastic force of the spring supporting a lower portion of the inner panel.

7. The gripper for the door of claim 4, wherein:
   the laser beam sensor comprises a light emitting unit and a light receiving unit, and
   the laser beam sensor is configured to sense that a falling position of the locking plate reaches a reference position by using a laser beam transmitted from the light emitting unit and received by the light receiving unit and further configured to transmit a falling sensing signal to the pressure control valve.

8. The gripper for the door of claim 7, wherein:
   the pressure control valve includes an upper pressure control valve and a lower pressure control valve respectively configured to correspond to the upper picking unit and the lower picking unit, and
   the upper pressure control valve and the lower pressure control valve set the pressure of the guide air cylinder to a low pressure lower than a critical pressure during initial operations of the upper picking unit and the lower picking unit to prevent damage to the inner panel.

9. The gripper for the door of claim 8, wherein:
   the upper pressure control valve and the lower pressure control valve maintain a low pressure lower than a critical pressure until receiving the falling sensing signal from the laser beam sensor, and
   when receiving the falling sensing signal, the upper pressure control valve and the lower pressure control valve increase the pressure of the guide air cylinder by a certain amount to strengthen a regulatory force of the inner panel.

10. The gripper for the door of claim 1, wherein the side clamping unit is configured to hold an inner surface of the side point with a clamper rotating around a hinge axis by a forward operation of the clamping cylinder while the fixing locator is placed on an outer surface of the side point.

11. The gripper for the door of claim 1, wherein the control unit is configured to control the upper point and the lower point to be controlled by using the picking unit after completing clamping of the side point by using the side clamping unit.

12. The gripper for the door of claim 1, wherein the control unit comprises:
 a robot controller configured to measure an actual measurement distance from the inner panel through a laser sensor and derive a distance difference between the actual measurement distance and a reference distance set based on robot teaching; and
 a gripper controller configured to interoperate with the robot controller and control operations of the picking unit and the side clamping unit.

13. The gripper for the door of claim 12, wherein the gripper controller is configured to control a pressing force of the bundle pin locator formed at a tip of the picking unit in stages through the pressure control valve.

14. A control method of a gripper mounted on a robot to pick a door loaded on a pallet, the control method comprising:
 moving the gripper to a set picking position of the door through motion control of the robot;
 adjusting a moving distance of the robot by measuring a distance difference between a side clamping unit and an inner panel by using a laser sensor mounted on the side clamping unit of the gripper;
 holding a side point of the inner panel by using the side clamping unit; and
 applying pressure to and regulating an upper point and a lower point of the inner panel through a bundle pin locator configured in a picking unit of the gripper.

15. The control method of claim 14, wherein adjusting the moving distance of the robot comprises:
 measuring an actual measurement distance from the inner panel by using the laser sensor; and
 deriving the distance difference by subtracting a reference distance set based on robot teaching from the actual measurement distance.

16. The control method of claim 14, wherein adjusting the moving distance of the robot comprises:
 comparing the distance difference with an allowable value for a clamping operation of the side clamping unit; and
 adjusting a position of the gripper in a forward/backward direction based on the distance difference when the distance difference exceeds the allowable value.

17. The control method of claim 14, wherein regulating the upper point and the lower point comprises:
 controlling each guide air cylinder to a low pressure by setting a pressure control valve in an initial operation step of the picking unit;
 maintaining the low pressure while the bundle pin locator is in contact with the inner panel and monitoring whether some of hexagon pin locators in contact with the inner panel reach at a reference position through a laser beam sensor; and
 when falling sensing signals of some of the hexagon pin locators are received from the laser beam sensor, strengthening a regulatory force of the inner panel with an increased force by increasing the pressure of the guide air cylinder by a certain amount.

* * * * *